United States Patent
Yamamoto

(10) Patent No.: US 6,336,261 B1
(45) Date of Patent: Jan. 8, 2002

(54) SEATBELT SYSTEM PROVIDED WITH BUCKLE STAY

(75) Inventor: Kazuo Yamamoto, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/464,404

(22) Filed: Dec. 16, 1999

(30) Foreign Application Priority Data

Dec. 16, 1998 (JP) ............................................. 10-357932

(51) Int. Cl.[7] ........................ A44B 11/25; B60R 21/00; F16B 9/00
(52) U.S. Cl. ........................... 24/687; 24/679; 297/468
(58) Field of Search ..................... 24/687, 679; 297/468

(56) References Cited

U.S. PATENT DOCUMENTS

| ,502,962 | A | * | 5/1893 | Green ........................... 24/687 |
| 1,489,913 | A | * | 4/1924 | Anderson ...................... 24/687 |
| 4,199,190 | A | * | 4/1980 | Lindblad ...................... 297/468 |
| 4,674,801 | A | * | 6/1987 | DiPaola et al. .............. 297/472 |
| 4,915,451 | A |   | 4/1990 | Forget et al. |
| 5,141,352 | A | * | 8/1992 | McManus et al. ........... 403/192 |
| 6,149,199 | A | * | 11/2000 | Feile et al. ............... 280/801.1 |

FOREIGN PATENT DOCUMENTS

EP               478886            4/1992

* cited by examiner

*Primary Examiner*—Victor N. Sakran
(74) *Attorney, Agent, or Firm*—Crowell & Moring LLP

(57) ABSTRACT

A seatbelt system includes a buckle stay. The buckle stay is provided with an anchor for being fixedly fastened on a vehicle body and also with a buckle stay member fixed at an end thereof on the anchor and connected at an opposite end thereof with a buckle base of the seatbelt system. The buckle stay member is branched into a plurality of end portions on a side of its one end where the buckle stay member is fixed on the anchor. The branched end portions are fixedly secured in the anchor portions, respectively.

9 Claims, 2 Drawing Sheets

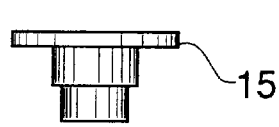
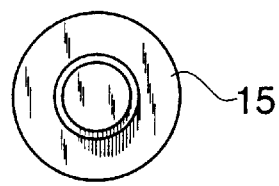
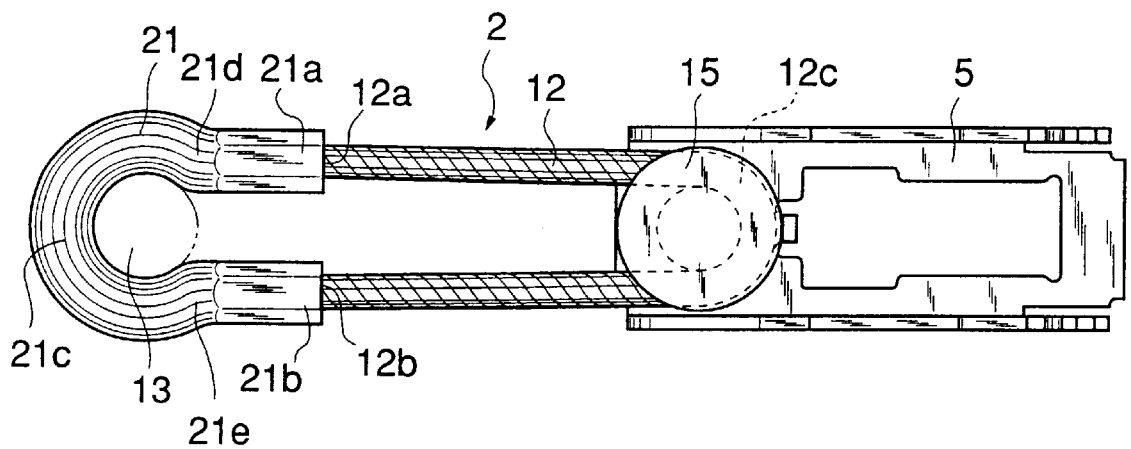
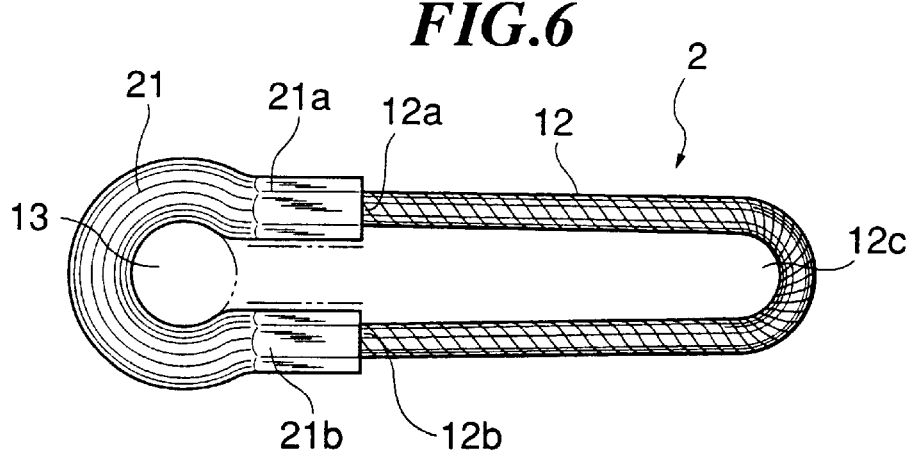

SEATBELT SYSTEM PROVIDED WITH BUCKLE STAY

BACKGROUND OF THE INVENTION a) Field of the Invention

This invention relates to a buckle stay for supporting a buckle in a seatbelt system to be mounted on a vehicle body.

b) Description of the Related Art

A seat of a vehicle such as an automotive vehicle is conventionally provided with a seatbelt system to ensure safety of an occupant. In this seatbelt system, a webbing which serves to protect the occupant in the seat is connected at an end thereof to a retractor arranged in a lower part of a center pillar and is fixed at an opposite end thereof on an anchor plate arranged on a lower part of the center pillar. A tongue plate is slidably arranged on the webbing. Fastening or unfastening of the webbing is effected by latching or unlatching the tongue plate in or from a buckle supported by a buckle stay which is arranged on a floor of the vehicle with the seat located between the buckle stay and the retractor.

The buckle stay is generally provided with an anchor fixedly fastened on the vehicle and also with a buckle stay member fixed at an end thereof on the anchor and connected at an opposite end thereof with the buckle of the seatbelt system.

Buckle stays of various designs have been proposed as such buckle stays to date, for example, including a buckle stay with a buckle stay member formed by providing a wire or cable (hereinafter collectively called "a wire"), bending the wire such that it is curved at a central portion thereof into a loop, fixing the loop portion on a buckle base of a buckle, inserting opposite ends of the wire into holes formed in the anchor, and then crimping the anchor around the holes to fix the opposite ends of the wire.

For example, a buckle stay disclosed in U.S. Pat. No. 4,915,451 is provided with a wire bent in a loop at a central portion thereof and also with an attachment plate for fixedly fastening the wire on a vehicle body. The wire is fixed on a buckle on a side of the loop, and opposite end portions of the wire have been fixedly secured to the attachment plate by inserting the opposite end portions into channels of the attachment plate, respectively, and then crimping the attachment plate around the channels to hold the opposite end portions in place.

To assemble the buckle stay disclosed in U.S. Pat. No. 4,915,451, the opposite end portions of the wire, that is, two wires are inserted together into their corresponding channels formed in the attachment plate, and the attachment plate is then crimped around the channels. However, insertion of two wires into their corresponding channels at the same time is however more difficult than insertion of a single wire into a channel. Further, fixing of two wires by crimping at the same time is more difficult than fixing of a single wire by crimping.

When two wires are fixed together by crimping, the wires themselves have such stiffness that, when the buckle stay is mounted on a vehicle, the wires themselves can be readily bent in both longitudinal and lateral (transverse) directions of the vehicle. When mounted on the vehicle, the stability of the buckle stay is not very high accordingly. To improve the fitness to an occupant, it is preferably for the stay member to be resistant to bending in the longitudinal direction of the vehicle but to be easily bendable in the lateral direction of the vehicle. If it is intended to increase the stiffness of a buckle stay in the longitudinal direction, use of a high-stiffness wire is desired. However, this also leads to high stiffness in the lateral direction.

The buckle stay of the above-described construction is also required to have highly-reliable strength at the crimped portion where the wires are held together by crimping, because loads concentrate in their entirety on the crimped portions.

To obtain the attachment plate, complex pressing work is needed, thereby requiring labor.

SUMMARY OF THE INVENTION

With the foregoing background in view, the present invention has as an object thereof the provision of a seatbelt system provided with a buckle stay which requires simpler assembling steps, which can disperse to plural locations a load applied on a buckle stay member and which can also enhance reliability in strength.

To achieve the above-described object, the present invention provides a seatbelt system provided with a buckle stay for supporting a buckle, wherein the buckle stay comprises:

an anchor for being fixedly fastened on a vehicle body, said anchor being provided with a plurality of anchor portions; and a buckle stay member fixed at an end thereof on the anchor and connected at an opposite end thereof with the buckle, said buckle stay member being branched at the one end thereof into a like plural number of end portions, and said branched end portions being fixedly secured by the anchor portions, respectively.

To achieve the above-described object, the present invention also provides a seatbelt system provided with a buckle stay for supporting a buckle, wherein the buckle stay comprises:

an anchor for being fixedly fastened on a vehicle body, said anchor being formed of a pipe-shaped member and comprising:

a bent portion for surrounding a member to be used to fixedly fasten the buckle stay on the vehicle body, and a pair of extensions extending out from the bent portion and terminating at free ends thereof in anchor portions such that the bent portion, the paired extensions and the anchor portions, in combination, have a substantially U-shaped form; and a buckle stay member formed of a wire in a substantially U-shaped form such that the buckle stay member is fixedly secured by the anchor portions at free end portions of the wire, respectively, and is connected with the buckle at a central curved portion of the wire.

In each of the buckle stays of the above-described constructions, the buckle stay member is fixed at plural portions thereof on the anchor so that a load applied to the buckle stay, for example, in the event of a vehicular collision or the like can be dispersed to the plural portions. Described specifically, the load can be borne at the respective branched end portions, thereby making it possible to avoid concentration of the load at any particular portion and hence to enhance reliability in strength.

Further, the buckle stay in which the buckle stay member is formed of the wire in the substantially U-shaped form and is fixed at the free end portions is characterized in that its stiffness in the lateral direction of a vehicle is not high although its stiffness in the longitudinal direction of the vehicle is high because two wire portions are highly resistant to compression forces.

BRIEF DESCRIPTION OF THE DRAWINGS

FIG. 4A is a side view of a rivet for fixing the buckle stay on the buckle base, both of which are shown in FIG. 1;

FIG. 4B is a plan view of the rivet of FIG. 4A;

FIG. 5 is a plan view of a buckle stay and a buckle base, on which the buckle stay is fixed, in a seatbelt system according to a second embodiment of the present invention; and FIG. 6 a plan view showing a buckle stay member of FIG. 1 fixed on an anchor.

DETAILED DESCRIPTION OF THE PREFERRED EMBODIMENTS

Figure 1:
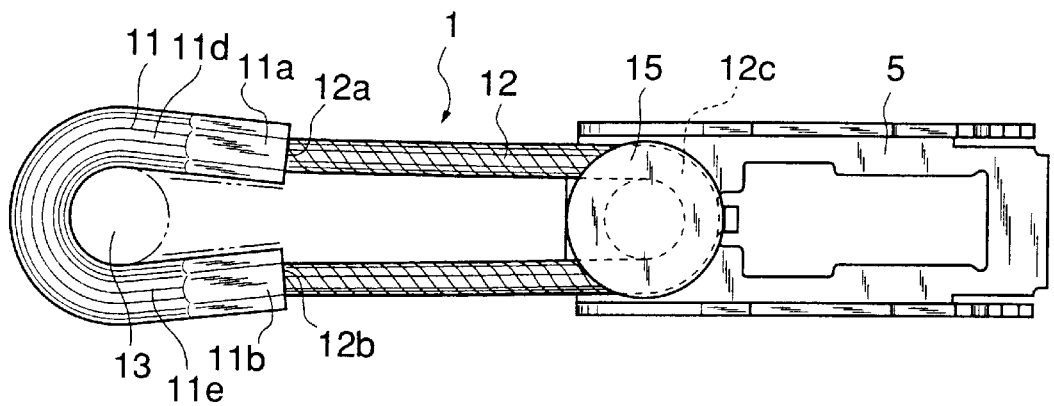
FIG. 1 is a plan view of a buckle stay and a buckle base, on which the buckle stay is fixed, in a seatbelt system according to a first embodiment of the present invention.

The seatbelt systems according to the first and second embodiments of the present invention will hereinafter be described with reference to the accompanying drawings.

As is illustrated in FIG. 1 through FIG. 4(B), the buckle stay 1 in the seatbelt system according to the first embodiment is provided with a buckle stay member 12 and an anchor 11. The buckle stay member 12 is fixed on a buckle base 5 of a buckle of the seatbelt system so that the buckle base 5 is supported by the buckle stay member 12. The anchor 11 serves to fixedly fasten the buckle stay member 12 on a floor or the like of a vehicle.

The anchor 11 has been formed by bending an iron-made pipe member, which is preferably hollow, at a substantially central portion thereof such that the central portion is curved into an open loop form, and the anchor 11 is therefore in a substantially U-shaped form. The anchor 11 hence has a bent portion 11c and a pair of extensions 11d,11e extending out from the bent portion. The extensions 11d,11e of the anchor 11 terminate, at free end thereof, into socket portions 11a, 11b as anchor portions. Free end portions 12a,12b of the buckle stay 12, which will be described in detail subsequently herein, are inserted in the socket portions 11a,11b, respectively.

The socket portions 11a,11b have been formed by making use of the pipe-like shape of the anchor 11. Namely, the pipe member which makes up the anchor 11 has an inner diameter large enough to permit insertion of the free end portions 12a,12b of the buckle stay member 12 to be described in detail subsequently herein. The bent portion 11c of the anchor 11 defines a bolt hole 13 in which a bolt (not shown) is to be inserted as a fixing member for fixedly fastening the anchor 11 to the floor or the like of the vehicle.

Both of the extensions 11d ,11e of the anchor 11 are elastically deformable, and are formed such that, when the free end portions 12a,12b of the buckle stay member 12 have not been inserted yet, both free end portions of the anchor 11 are put somewhat inwardly to make the distance between these free end portions smaller than the diameter of the bolt hole 13 as indicated by phantoms in FIG. 1. Owing to this construction, insertion of a bolt into the bolt hole 13 of the anchor 11 makes it possible to fix the buckle stay member 12 at its mounted position.

Figure 2:
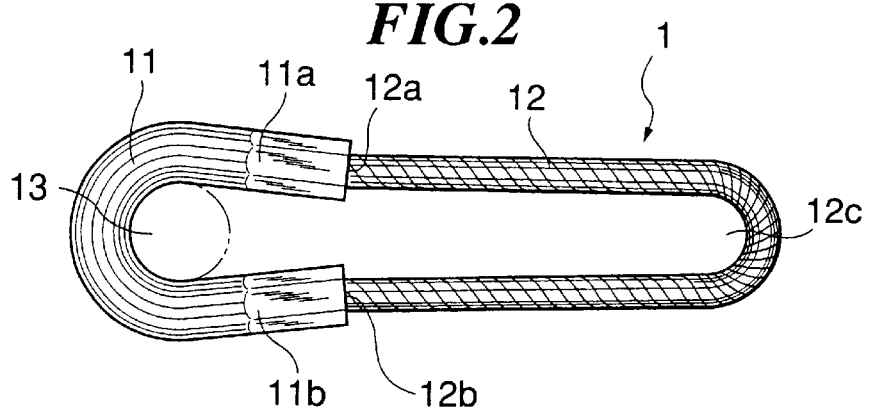
FIG. 2 is a plan view showing a buckle stay member of FIG. 1 fixed on an anchor.
Figure 3:
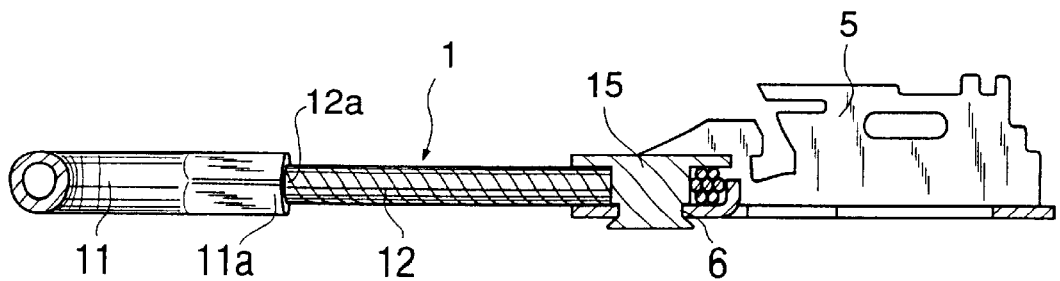
FIG. 3 is a side view of the buckle stay and buckle base of FIG. 1.

When the free end portions 12a,12b of the buckle stay member 12 are inserted into the socket portions 11a,11b of the anchor 11, respectively, on the other hand, both of the free end portions of the anchor 11 are elastically deformed somewhat outwardly as indicated by solid lines in FIG. 1 and FIG. 2. Nonetheless, the distance between the end portions is still slightly smaller than the diameter of the bolt hole 13. Owing to this, the anchor 11 remains stably fixed on the floor of the vehicle without being caused to shift from its fixed position after the buckle stay member 12 is fixed on the anchor 11.

The buckle stay member 12 has been formed by bending a wire at a substantially central portion thereof such that the central portion is curved into an open loop form, and the anchor 11 is therefore in a substantially U-shaped form. In other words, the buckle stay member 12 is bifurcated at an end thereof (on a side where the buckle stay member 12 is fixed on the anchor 11) and is bent at an opposite end thereof into a loop portion 12c.

This buckle stay member 12 can be fixed on the buckle by placing the buckle stay member 12 on the buckle base 5 such that the loop portion 12c is brought into registration with a rivet hole 6 formed through the buckle base 5, inserting a rivet 15 through the loop portion 12c and the rivet hole 6 of the buckle base 5 to hold the buckle stay member 12 in place, and then crimping, hammering or pressing the rivet 15 on a back side of the buckle base 5.

The free end portions 12a,12b of the buckle stay member 12 are inserted into the socket portions 11a,11b of the anchor 11, respectively, and the socket portions 11a,11b are then crimped. In the seatbelt system according to the first embodiment, the free end portions 12a,12b of the buckle stay member 12 are inserted in the respective socket portions 11a,11b , in other words, each socket portion is inserted with only one of the free end portions. Accordingly, the free end portions 12a,12b can be readily inserted into their corresponding socket portions 11a,11b . Further, the socket portions 11a,11b are crimped with the free end portions 12a,12b separately inserted therein, so that the free end portions 12a,12b can be fixed in place without failure.

The buckle stay member 12 is therefore fixed at two locations on the anchor 11. Further, a closed loop is formed by the anchor 11 and the buckle stay member 12.

As has been described above, the anchor in the seatbelt system according to the first embodiment is formed of the iron-made pipe member and has the above-mentioned substantially U-shaped form. It is therefore unnecessary to conduct complex steps to form a bolt hole and socket portions for the insertion of a bolt and the buckle stay member. In other words, an appropriate anchor can be obtained by simply bending a pipe member into the above-described form. This makes it possible to reduce the number of parts required for the buckle stay and also to simplify its fabrication steps.

In the seatbelt system according to the first embodiment, the buckle stay member is fixed at the two locations on the anchor so that a load applied to the buckle stay, for example, in the event of a vehicular collision can be dispersed to the two locations. The load is therefore not applied concentrating on a single location, thereby making it possible to enhance reliability in strength. Further, the buckle stay member can be obtained by simply bending a wire into the above-described form. This also makes it possible to reduce the number of parts required for the buckle stay and also to simplify its fabrication steps.

The anchor in the first embodiment was formed of the substantially U-shaped, iron-made pipe. It is however to be noted that no particular limitations are imposed on the shape and material of the anchor insofar as the branched plural end portions of the buckle stay member can be individually fixed.

The buckle stay member in the first embodiment was formed of the substantially U-shaped wire. It is also to be noted that no particular limitations are imposed on the construction of the buckle stay member insofar as the buckle stay member is branched or otherwise divided into plural portions, such as prongs or teeth, on the end portion thereof where the buckle stay member are fixed on the anchor.

In the first embodiment, the bolt was referred to as a member for fixedly fastening the anchor on the floor of the vehicle. However, this fastening member is not limited to such a bolt, and the anchor may be secured on the floor of the vehicle by a fastening member or method of a type different from bolts.

In the first embodiment, the buckle stay member was fixed on the buckle base by holding the buckle stay member at the loop portion thereof with the rivet and then crimping, hammering or pressing the rivet. However, the method for fixing the buckle stay member on the buckle base is not limited to this fixing method, and the buckle stay member may be secured on the buckle base by a fixing member or method of a type different from rivets.

In the first embodiment, the buckle stay member was fixed on the anchor by inserting the end portions of the buckle stay member into the corresponding socket portions of the anchor and then crimping the socket portions. However, the method for fixing the buckle stay member on the anchor is not limited to this fixing method, and the buckle stay member may be secured on the anchor by a different fixing method.

The seatbelt system according to the second embodiment will next be described with reference to FIG. 5 and FIG. 6, in which members similar to their corresponding ones in the buckle stay in the seat belt system according to the first embodiment will be identified by like reference numerals, and their description is omitted herein.

The buckle stay member 2 in the seatbelt system according to the second embodiment is different in the shape of an anchor from the buckle stay member 1 in the seatbelt system according to the first embodiment.

As is illustrated in FIG. 5 and FIG. 6, the anchor 21 of the buckle stay 2 has been formed by bending an iron-made pipe member, which is preferably hollow, at a substantially central portion thereof such that the central portion is curved into an open loop form, and the anchor 21 is therefore in a substantially U-shaped form. The anchor 21 hence has a bent portion 21c and a pair of extensions 21d,21e extending out from the bent portion. Both of the extensions 21d,21e of the anchor 21 are elastically deformable, and are formed substantially in parallel with each other such that, when the free end portions 12a,12b of the buckle stay member 12 have not been inserted yet in socket portions 21a,21b of the anchor 21, both free end portions of the anchor 21 are put somewhat inwardly to make the distance between these free end portions smaller than the diameter of the bolt hole 13 as indicated by phantoms in FIG. 6.

Owing to this construction, insertion of a bolt into the bolt hole 13 of the anchor 21 makes it possible to fix the buckle stay member 12 at its mounted position.

When the free end portions 12a,12b of the buckle stay member 12 are inserted into the socket portions 21a,21b of the anchor 21, respectively, on the other hand, both of the extensions 21d,21e of the anchor 21 are elastically deformed somewhat outwardly as indicated by solid lines in FIG. 5 and FIG. 6. Nonetheless, the distance between these extensions 21d,21e is still slightly smaller than the diameter of the bolt hole 13. Owing to this, the anchor 21 remains stably fixed on the floor of the vehicle without being caused to shift from its fixed position after the buckle stay member 12 is fixed on the anchor 21.

This application claims the priority of Japanese Patent Application No. HEI 10-357932 filed Dec. 16, 1998, which is incorporated herein by reference.

What is claimed is:

1. A seatbelt system provided with a buckle stay for supporting a buckle, wherein said buckle stay comprises:

an anchor for being fixedly fastened on a vehicle body, said anchor being provided with a plurality of anchor portions; and a buckle stay member fixed at an end thereof on said anchor and connected at an opposite end thereof with said buckle, said buckle stay member being branched at said one end thereof into a like plural number of end portions, and said branched end portions being fixedly secured by said anchor portions, respectively, wherein said anchor comprises:

a bent portion for surrounding a member to used fixedly fasten said buckle stay on said vehicle body; and a pair of extensions extending out from said bent portion and terminating at free ends thereof in said anchor portions such that said bent portion, said paired extensions and said anchor portions, in combination, have a substantially U-shaped form.

2. A seatbelt system according to claim 1, wherein said anchor is formed of a pipe-shaped member.

3. A seatbelt system according to claim 2, wherein said branched end portions of said buckle stay member have been fixedly secured by inserting said branched end portions into said anchor portions and then crimping the said anchor portions, respectively.

4. A seatbelt system according to claim 1, wherein said paired extensions are formed with an interval therebetween progressively decreasing toward said free ends thereof.

5. A seatbelt system according to claim 1, wherein said paired extensions extend substantially in parallel with each other such that said paired extensions are apart from each other at a distance smaller than a diameter of said member to be used to fixedly fasten said buckle stay on said vehicle body.

6. A seatbelt system according to claim 1, wherein said buckle stay member has a substantially U-shaped form with a central portion thereof bent in a curved shape.

7. A seatbelt system according to claim 6, wherein said buckle stay member is formed of a wire.

8. A seatbelt system according to claim 1, wherein said buckle stay member has said substantially U-shaped form with a central portion thereof bent in a curved shape such that said anchor and said buckle stay member, in combination, form a closed loop.

9. A seatbelt system provided with a buckle stay for supporting a buckle, wherein said buckle stay comprises:

an anchor for being fixedly fastened on a vehicle body, said anchor being formed of a pipe-shaped member and comprising:

a bent portion for surrounding a member to be used to fixedly fasten said buckle stay on said vehicle body, and a pair of extensions extending out from said bent portion and terminating at free ends thereof in anchor portions such that said bent portion, said paired extensions and said anchor portions, in combination, has a substantially U-shaped form; and a buckle stay member formed of a wire in a substantially U-shaped form such that said buckle stay member is fixedly secured by said anchor portions at free end portions of said wire, respectively, and is connected with said buckle at a central curved portion of said wire.

* * * * *